(12) United States Patent
Buonomo et al.

(10) Patent No.: US 9,772,983 B2
(45) Date of Patent: Sep. 26, 2017

(54) AUTOMATIC COLOR SELECTION

(71) Applicant: Verizon Patent and Licensing Inc., Basking Ridge, NJ (US)

(72) Inventors: Michael Buonomo, Acton, MA (US); Avinash S. Chugh, Nashua, NH (US); Evgenia Jane Florins, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 659 days.

(21) Appl. No.: 14/031,194

(22) Filed: Sep. 19, 2013

(65) Prior Publication Data

US 2015/0082150 A1  Mar. 19, 2015

(51) Int. Cl.
*G06F 17/00* (2006.01)
*G06F 17/22* (2006.01)

(52) U.S. Cl.
CPC ........ *G06F 17/2288* (2013.01); *G06F 17/227* (2013.01)

(58) Field of Classification Search
CPC .... G06F 17/2247; G06F 17/24; G06F 17/211; G06F 17/236; G06F 17/2288; G06F 17/227; G06F 17/30247; G06F 17/30277; G06F 17/3025; G06F 17/3053; G06F 17/30867

USPC .................................................. 715/243, 236
See application file for complete search history.

(56) References Cited

U.S. PATENT DOCUMENTS

| | | | | |
|---|---|---|---|---|
| 8,165,915 | B1* | 4/2012 | Lucash | G06Q 30/02 705/14.4 |
| 8,326,029 | B1* | 12/2012 | Obrador | G06F 17/3025 382/164 |
| 2006/0026628 | A1* | 2/2006 | Wan | H04N 5/272 725/32 |
| 2008/0285806 | A1* | 11/2008 | Kokaram | G06T 7/2006 382/107 |
| 2009/0028434 | A1* | 1/2009 | Vanhoucke | G06Q 30/02 382/182 |
| 2009/0031003 | A1* | 1/2009 | Velarde | G06F 17/3025 709/217 |
| 2014/0071149 | A1* | 3/2014 | Chu | G09G 5/02 345/589 |

* cited by examiner

*Primary Examiner* — Scott Baderman
*Assistant Examiner* — Jason Edwards

(57) ABSTRACT

A system and method relate to identifying a first color associated with a document, and versions of data to be added to the document are associated with, respectively, a plurality of second colors. The first color and the plurality of second colors are compared to form comparison results, and a particular version of the added content is selected from the plurality of versions of the data based on the comparison results. A modified document that includes the particular version of the data is formed and provided to the client device.

20 Claims, 7 Drawing Sheets

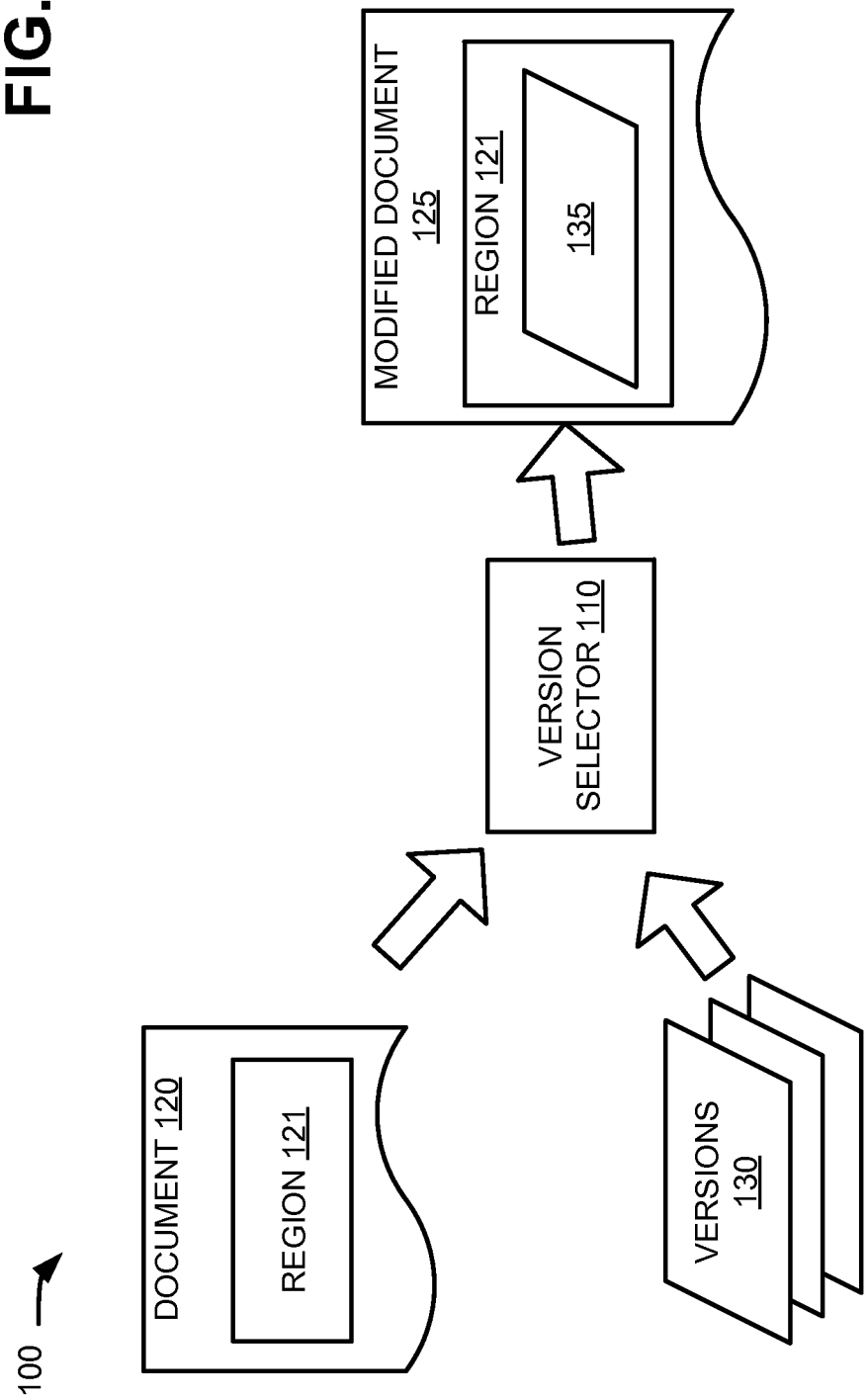

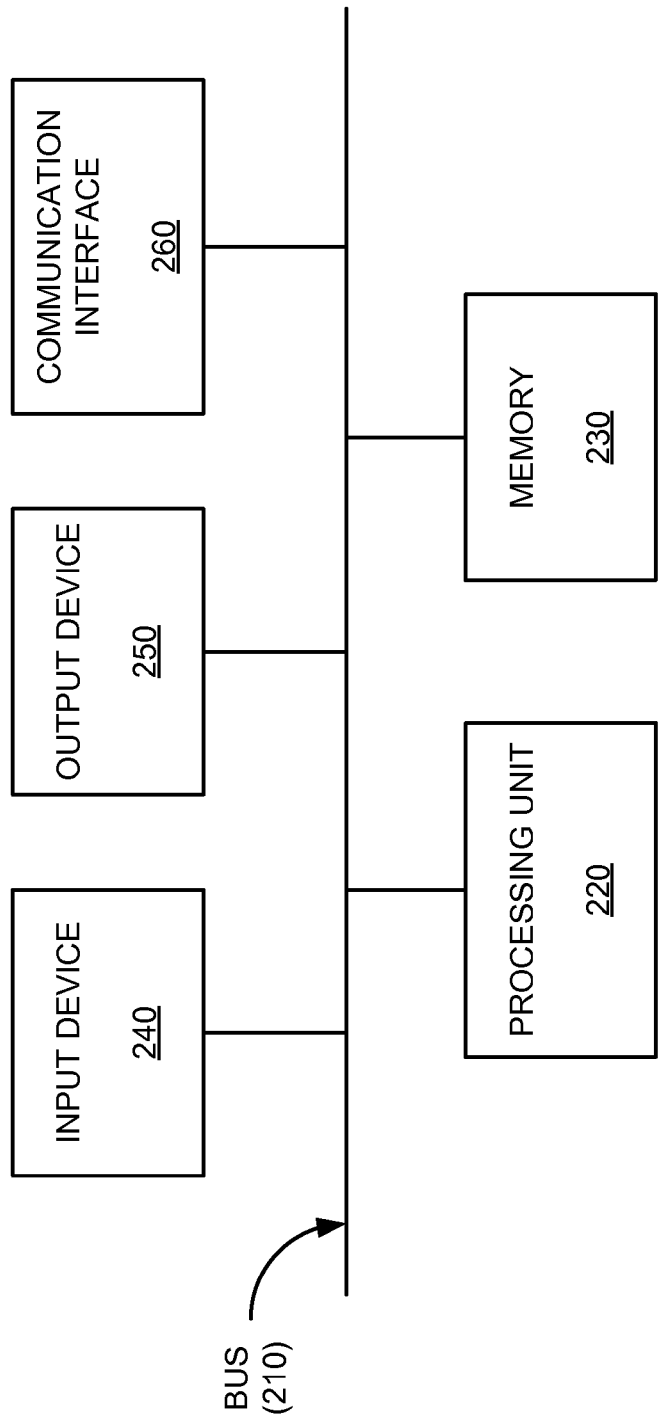

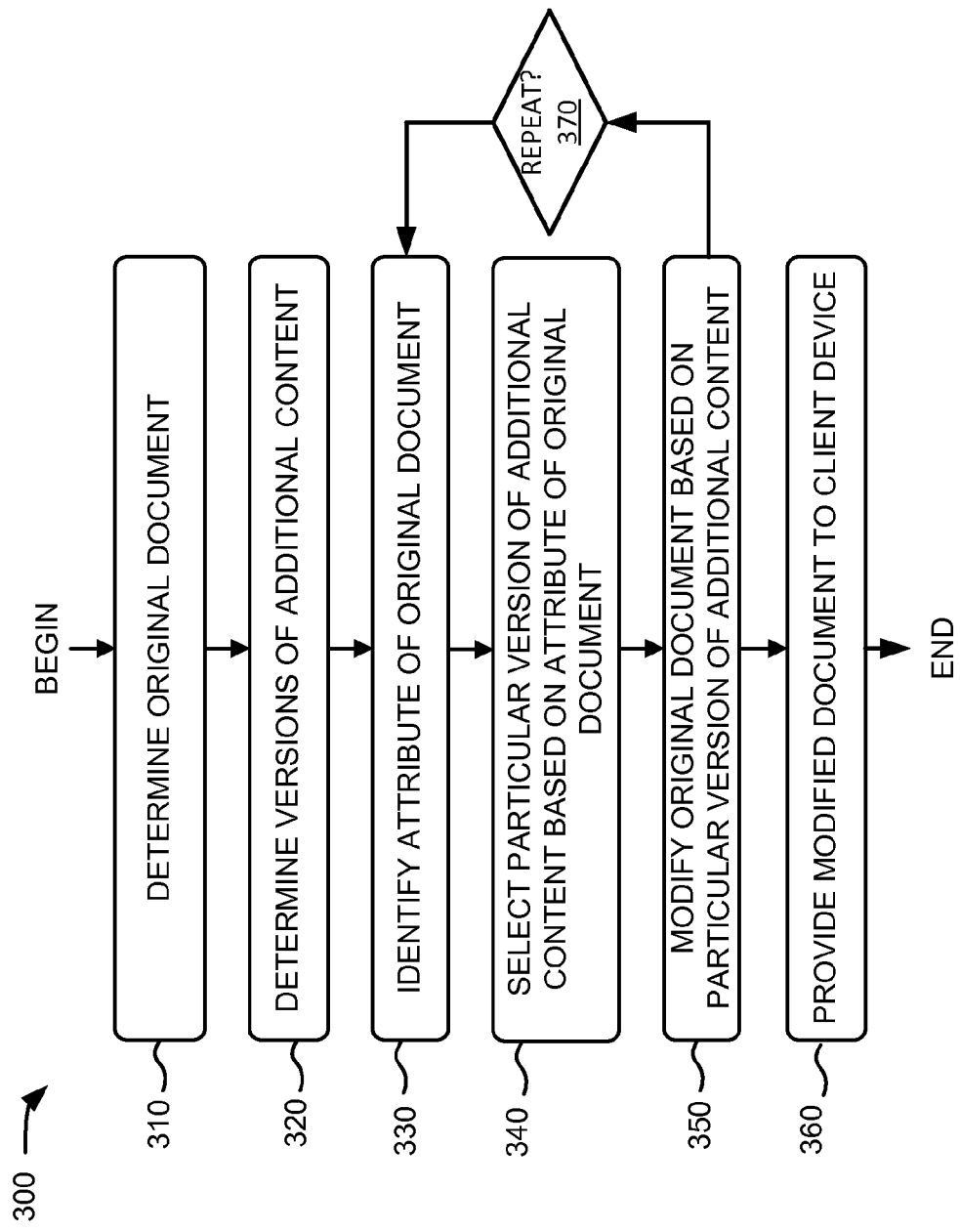

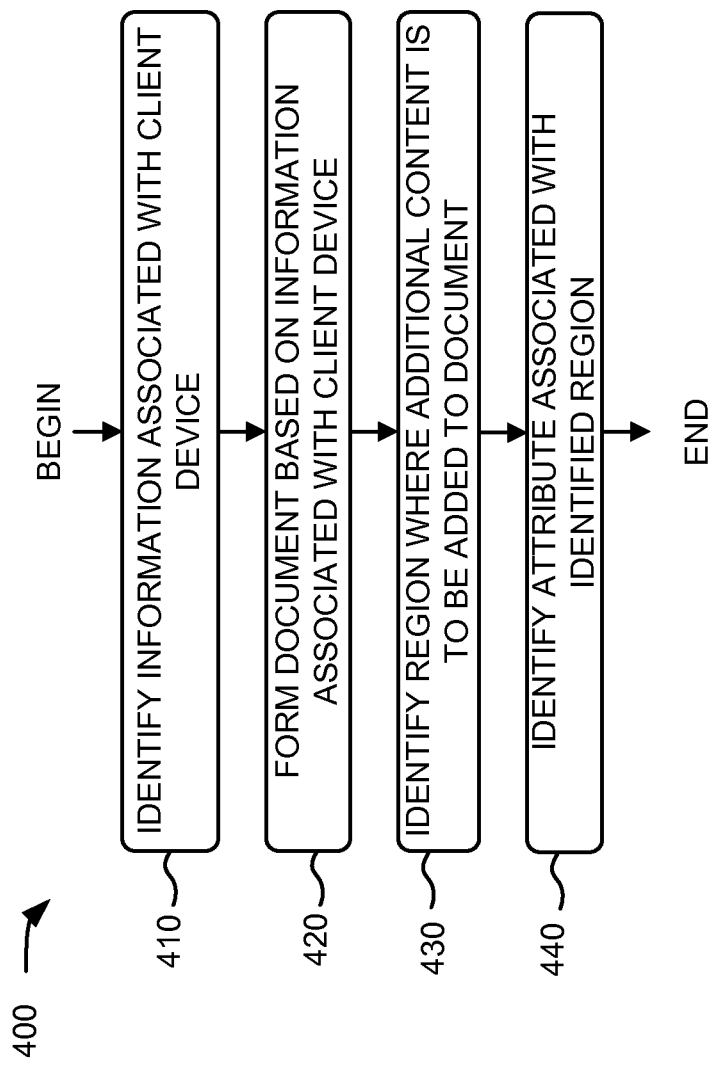

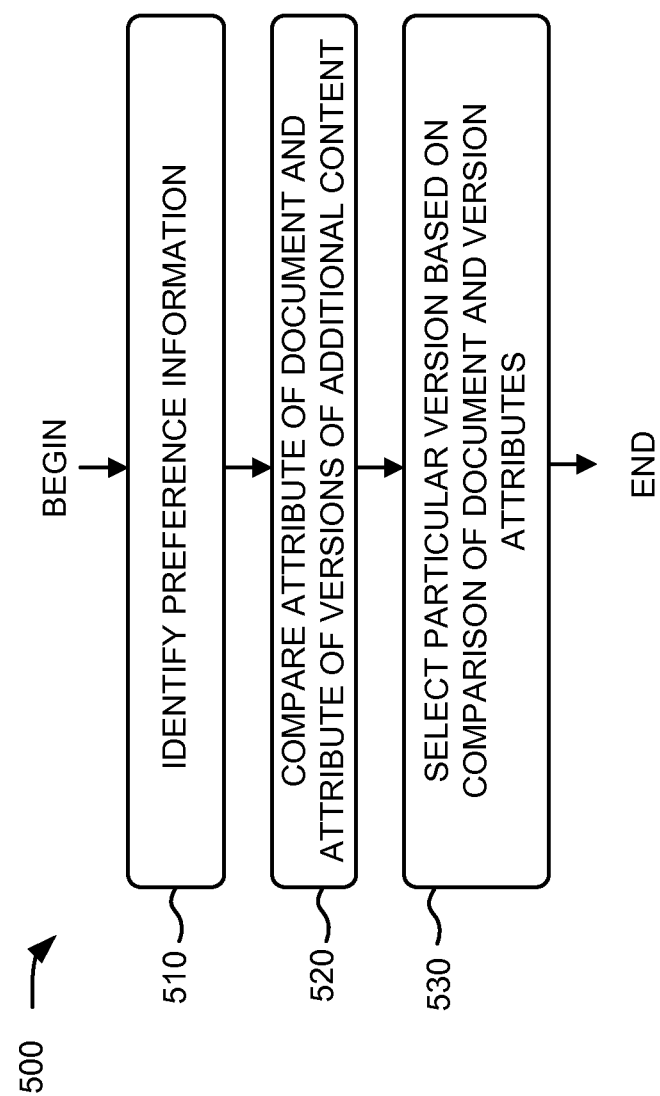

AUTOMATIC COLOR SELECTION

BACKGROUND

Content may be added to and/or overlaid over a document (i.e., an image, a web page, a video, etc.) before the document is provided to a user. For example, messages, text corresponding to dialog (e.g., closed captioning), internet data (e.g., search results), messages from social media, data from another document, advertisements, etc., may be added to a document. Attributes of the additional content, such as a color of the additional content, is selected regardless of displayed attributes of the document.

BRIEF DESCRIPTION OF THE DRAWINGS

FIGS. 1A and 1B depict an exemplary system for forming a modified document that includes additional content based on attributes of the additional content and of the document;

FIG. 2 depicts components of an exemplary device included in the system of FIGS. 1A and 1B;

FIGS. 3-5 depict flow diagrams of an exemplary process for forming a modified document that includes additional content based on attributes of the additional content and of the document.

DETAILED DESCRIPTION OF PREFERRED EMBODIMENTS

The following detailed description refers to the accompanying drawings. The same reference numbers in different drawings identify the same or similar elements.

An implementation described herein may relate to automatically selecting an attribute of content to be added to a document. The added content may include, for example, an image, video, sound, or text, and the attribute of the content may correspond to, for example, a color (or hue), an intensity (or brightness), a size, a position, a font, displayed duration, volume of sound, etc., of the content. The attribute of the content may be selected to, for example, complement, or contrast with portions of the document.

A document, as the term is used herein, is to be broadly interpreted to include any machine-readable and machine-storable work product. A document may include, for example, an e-mail, a web page or a web site, a file, a combination of files, one or more files with embedded links to other files, a news group posting, a news article, a blog, a business listing, an electronic version of printed text, a web advertisement, etc. In the context of the web (i.e., the Internet), a common document may be a web page. Documents often include textual information and may include embedded information (such as meta information, images, hyperlinks, etc.) and/or embedded instructions (such as Javascript, etc.).

Figure 1A:
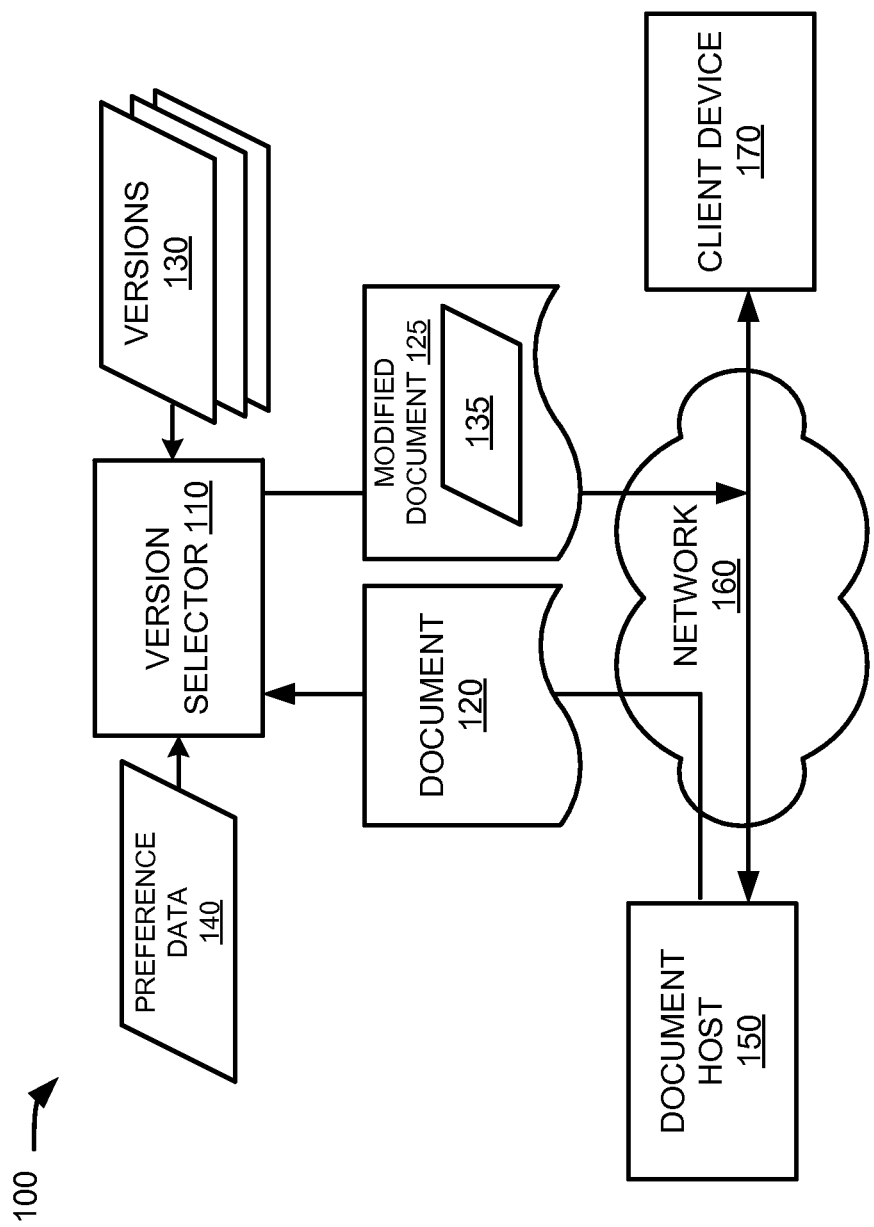

FIG. 1A depicts an exemplary system 100 for selecting an attribute of content to be added to a document in accordance with an implementation provided herein. As illustrated in FIG. 1A, system 100 may include a version selector 110 that may determine data associated with document 120 and versions 130 of additional content. Version selector 110 may select a particular version 135 from versions 130 of the additional content based on the attributes of document 120 and versions 130. Particular version 135 may be added to document 120 to form modified document 125.

Each of versions 130 of the additional content may include a unique respective attribute or combination of attributes (e.g., a color, intensity, size, position, font, display duration, etc.). For example, versions 130 of the content may be associated with respective red, green, and blue (RGB) values or ranges of values that are used by a display device to present the content. Version selector 110 may select particular version 135 based on comparing attributes of document 120 and versions 130. For example, version selector 110 may select particular version 135 having content with a particular RGB value with a desired relationship to one or more RGB values associated with document 120. For example, if document 120 is associated with a broadcast of a sporting event between two teams, selected particular version 135 may include content having with a color that differs from colors in the uniforms of the two teams and is visible with respect to a playing surface (e.g., football field, basketball court, swimming pool, etc.) for the sporting event.

In certain embodiments, versions of the additional content may correspond to modifying content in document 120. For example, an attribute associated with an image in document 125 may be modified. The modified image may be overlaid over the original image. In one example, a color of the image may be modified to elevate a color of the background of the document.

Version selector 110 may select particular version 135 based on preference data 140. Preference data 140 may relate to desired attributes for document 120 and/or versions 130. For example, the preference data 140 may define a desired attribute value for particular version 135 (i.e., preference data 140 may specify a particular RGB color value or particular range of RGB color values). Preference data 140 may indicate relationships between attributes of document 120 and/or versions 130. For example, preference data 140 may indicate, for example, whether particular version 135 and document 120 should match, contrast, or coordinate. Preference data 140 may be received, for example, from an entity or user associated with document 120 (e.g., a content provider), versions 130 (e.g., a provider of the additional content), and/or client device 170.

As illustrated in FIG. 1B, version selector 110 may identify region 121 of document 120 to receive one of versions 130 of the additional content. Version selector 110 may select particular version 135 based on comparing attributes of region 121 and versions 130. In another implementation, version selector 110 may also identify region 121, from multiple regions in document 120, based on comparing attributes of the multiple regions of document 120 and versions 130. For example, particular version 135 may be selected based on a particular criteria (such as preference data 140), and version selector 110 may select region 121 to coordinate and/or contrast with particular version 135.

Continuing with FIG. 1A, version selector 110 may receive document 120 from document host 150 and may provide modified document 125 to client device 170 via network 160. For example, version selector 110 may cause document 120, hosted by document host 150, to be modified based on particular version 135 of the additional content to form modified document 125. Document host 150 may include one or more computing devices, such as server devices, that host document 120 and/or modified document 125 for access by client device 170. For example, document host 150 may include a server or other computing device that stores and provides document 120 and/or modified document 125 to client 170.

Network 160 may enable version selector 110, document host 150, and/or client device 170 to communicate with each other. Network 160 may include one or more wired and/or wireless networks. For example, network 160 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of the above networks, and/or another type of wireless network. Additionally, or alternatively, network 160 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks.

Client device 170 may include any device capable of accessing modified document 125 via network 160 using, for example, a browser application (e.g., Internet Explorer, Mozilla Firefox, Google Chrome, Apple Safari, Opera, etc.). Client device 170 may access document 120 and/or modified document 125 hosted by document host 150. Client device 170 may include, for example, a desktop computer; a laptop computer; a tablet computer; a mobile communication device, such as a mobile phone, a smart phone, a tablet computer, a laptop, a personal digital assistant (PDA), or another type of portable communication device; and/or another type of computation and/or communication device.

Although FIGS. 1A and 1B depict exemplary components of system 100, in other implementations, system 100 may include fewer components, different components, differently arranged components, or additional components than depicted in FIGS. 1A and 1B. Additionally or alternatively, one or more components of system 100 may perform functions described as being performed by one or more other components of system 100. For example, version selector 110 and document host 150 may be included in a common device. Also, while FIGS. 1A and 1B depicts a single version selector 110, a single document host 150, and a single client device 170 for illustrative purposes, in practice, system 100 may include multiple version selectors 110, multiple document hosts 150, and/or client devices 170.

FIG. 2 is a diagram illustrating exemplary components of device 200 according to an implementation described herein. Device 200 may correspond, for example, one or more components of version selector 110, document host 150, and/or client device 170. As illustrated in FIG. 2, device 200 may include, for example, a bus 210, a processing unit 220, a memory 230, an input device 240, an output device 250, and a communication interface 260.

Bus 210 may include a path that permits communication among the components of device 200. Processing unit 220 may include any type of single-core processor, multi-core processor, microprocessor, latch-based processor, and/or processing logic (or families of processors, microprocessors, and/or processing logics) that interprets and executes instructions. In other embodiments, processing unit 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processing unit 220, and/or any type of non-volatile storage device that may store information for use by processing unit 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to selecting particular version 135, from versions 130 of data to be included in document 120, based on attributes of particular version 135 and document 120. Device 200 may perform these operations in response to processing unit 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processing unit 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, two components may perform one or more tasks described as being performed by a component of device 200 or a component may perform one or more tasks described as being performed by two or more components of device 200.

FIG. 3 provides a flow diagram of exemplary process 300 for selecting particular version 135, from versions 130 of additional content to be added to document 120, based on attributes of document 120 and/or versions 130 of the additional content. In one implementation, process 300 may be performed by version selector 110. In other implementations, some or all of process 300 may be performed by another device or a group of devices separate from version selector 110 and/or including version selector 110.

Process 300 may include determining or identifying document 120 (block 310) and determining versions 130 of the additional content that may be added to document 120 (block 320). Document 120 may be selected by client device 170 and obtained from document host 150. For example, version selector 110 may receive a uniform resource locator (URL) or other identifier associated with document 120 and may use this information to acquire information associated with document 120. Versions 130 of the additional content may be received from another server. For example, dialog corresponding to document 120 may be obtained from a closed captioning device, internet data may be acquired from a search engine, messages may be obtained from a message server, data from another document may be obtained from document host 150, etc. Versions 130 of the additional content may vary by one or more attributes, such as having different colors and/or other appearance features (size, shape, position, font, brightness, opaqueness, etc.)

Document 120 and/or versions 130 may be represented by a code identifying respective contents and attributes associated with the contents. A style specification may express how a particular element, or a particular attribute, of a document is presented to a user. For example, a style specification may define a font, text size, color, layout, text effect, highlighting, lowlighting, whether an element should be displayed, and/or another attribute by relating the attribute to a particular value. In one embodiment, the style may be specified in a style sheet language, such as a Cascading Style Sheet (CSS) defining an attribute of the document, and each of versions 130 may include a change and/or update to the style sheet language. For example, if document 120 has a red (i.e., color code FF0000 in the RGB hex coding scheme) background, document 120 may be associated with a style definition expression corresponding to "style_def='background-color: #FF0000.'" In this example, versions 130 may include content associated with different possible RGB hex coding scheme coding values.

An attribute associated with document 120 may be identified (block 330). For example, as described above, an attribute of document 120 may be determined based on an expression value (e.g., an RGB color value) or style sheet associated with document 120. An attribute of document 120 may be determined by preparing document 120 for rendering by a display device and then determining an attribute associated with rendering document 120. For example, a style sheet associated with document 120 may be compiled as if displayed on client device 170.

Document 120 may vary over time, such as to reflect changes in conditions or data associated with document 120, and the attribute identified in block 330 may correspond to document 120 at a particular time. For example, the attribute determined in block 330 may reflect a state of document 120 at a particular time, such as an instantaneous color value associated with document 120 at the particular time. As an example, document 120 may correspond to a series of images, such as a movie, television show, etc., and the attribute identified in a block 330 may correspond to one of the images displayed at the particular time. For example, if an advertisement is to be overlaid on an image, the attribute may correspond to the color of the product one which the advertisement is to be overlaid.

In another implementation, the attribute identified in block 330 may be calculated based on states of the attribute of document 120 during different time periods. For example, the attribute identified in block 330 may correspond to an average, median, commonly present (or mode), common ranges, trends, etc., of the attribute over the different time periods. For example, a color associated with a portion of a document, identified in block 330, may correspond to an average color associated with the portion of document 120 over a period of time. In another implementation, stochastic processes, such as Markov chain analyses, or other statistical analysis techniques may be used to evaluate trends in an attribute over two or more time periods and may be used to predict a state of the attribute during another time period.

Particular version 135 may be selected from versions 130 of the added content based on the determined attribute of document 120 (block 340). In block 340, an attribute associated with document 120, determined in block 330, may be compared to corresponding attributes associated with versions 130 of the added content. For example, a color value associated with document 120 (such as the background of document 120) may be compared to respective different color values associated with versions 130. Particular version 135 of the added content may be selected in block 340 based on the comparison. For example, particular version 135 of the added content and document 120 may match (e.g., particular version 135 is associated with a RGB color value that corresponds with a RGB color value associated with document 120), contrast (e.g., the RGB color value of particular version 135 differs by at least a threshold value from the RGB color value associated with document 120), or coordinate with (e.g., particular version 135 has a similar RGB color value, but a different brightness than document 120).

Particular version 135 of the added content may be added to document 120 to form modified document 125 (block 350), and information associated with modified document 125 may be provided to client device 170 (block 360). For example, version selector 110 and/or document host 150 may modify a style sheet, CSS, hypertext markup language (HTML), JavaScript, etc., associated with document 120 to form modified document 125 that includes particular version 135. Version selector 110 may provide information associated with particular version 135 to document host 150 to enable document host 150 to provide modified document 125 to client device 170. For example, client device 170 may receive a URL or other information associated with modified document 125 and may use this information to access modified document 125 via document host 150.

Blocks 330-350 may be repeated for another time period or for other content (block 370). For example, the attribute associated with document 120 may be re-determined for the other time period, and the re-determined attribute may be used to select another version 135, from versions 130 of the additional data, that is used to be used to form modified document 125 associated with the other time period. In this manner, modified document 125 may change in near real-time based on the identified attributes. In another implementation, a different attribute associated with document 120 may be determined (repeating block 330). This different attribute may be used to select another version from versions 130 of the additional content, and this other version may also be included in the modified document (repeating blocks 340-350). For example, different versions of the additional content may be added to different sections of document 120.

Although FIG. 3 provides an exemplary process 300 for selecting particular version 135 of additional content to be added to document 120 based on attributes of document 120 and/or attributes of versions 130 of the additional content, in other implementations, additional, fewer, or different steps may be used than depicted in FIG. 3. For example, process 300 may include receiving a request for document 120 from client device 170 and determining particular version 135 of the added data in response to receiving the request. Also, the modified document 125 may be encoded, encrypted, and/or formatted for transmission and/or use by client device 170. In another implementation, particular version 135 of the added data may be further selected from versions 130 based on configuration information associated with client device 170, and particular version 135 may be selected to be compatible with client device 170. For example, if versions 130 correspond to different possible displayed characteristics for the additional content, particular version 135 may be selected by version selector 110 to be displayable by client device 170. Also, multiple attributes associated with document 120 may be identified in block 330 and the particular version of the additional content may be selected in block 340 based on these multiple attributes.

FIG. 4 provides a flow diagram of exemplary process 400 for identifying an attribute associated with document 120 in block 330. In one implementation, process 400 may be performed by version selector 110. In other implementations, some or all of process 400 may be performed by another device or a group of devices separate from version selector 110 and/or including version selector 110.

Process 400 may include identifying information associated with client device 170 and/or a user associated with client device 170 (block 410). For example, a location or other information (e.g., model, device type, compatible document formats, hardware configuration, etc.) associated with client device 170 may be identified. This information may be determined based on stored information associated with client device 170 and/or may be dynamically determined based on, for example, a request for document 120 or other communication from client device 170. For example, a location associated with client device 170 may be determined based on a network address identified in the communication or based on a location of an associated device, such as router or radio tower that client device 170 uses to connect to network 160.

Document 120 may be formed or compiled based on the information identified in block 410 (block 420). For example, a script associated with document 120 may be executed based on this information. Document 120 may be generated based on a location and/or other information associated with client device 170. The compiled version of document 120 may represent how document 120 would be rendered by client device 170. For example, document 120 may include commercial data, such as an advertisement, that is selected based on the location of client device 170. Contents of document 120 may also be dynamically generated or collected based on information identified in block 410. For example, document 120 may include search results or other data associated with a prior purchase by client device 170.

Region 121 of document 120, where the additional content associated with versions 130 is provided by modified document 125 when rendered, may be identified (block 430). The additional data may be positioned in a particular region or location of document 120. For example, a text box presenting closed captioning or other data may overlay a specific portion of document 120. Document 120 may be modified or formatted to form region 121 to receive the added data. For example, portions of document 120 may be compressed or modified to create space at a side, top and/or bottom of document 120 to receive the added data. In another implementation, different versions 130 of the added data may be associated with different regions of document 120.

In another implementation, region 121 may be selected from multiple regions in document 120. For example, region 121 may be selected based on an associated attribute. For example, region 121 may be selected to correspond to an attribute of one or more versions 130 of the additional data. For example, region 121 may be selected to provide sufficient space to present the additional data.

An attribute associated with region 121 of document 120 may be determined (block 440). For example, an attribute (e.g., a color) associated with region 121 or an adjacent region may be determined. The attribute may be determined by analyzing code, script, style sheet, or other information associated with region 121. The attribute may also be identified by analyzing the compiled version of document 120 to determine how region 121 would appear when rendered by client device 170.

An attribute for region 121 may be determined in block 440 based on respective attributes associated with sub-regions (e.g., graphical elements included in region 121). For example, colors or other attributes (e.g., sizes, shapes, movements, etc.) of different graphical elements included in region 121 may be determined and used to determine a composite attribute for region 121. For example, a color value associate with region 121 may reflect a median, mean, or other value based of the color values associated with pixels without region 121. In another implementation, a visual effect of the sub-regions may be processed to identify a subjective attribute of region. For example, a composite formed from multiple smaller images (e.g., a (or photographic mosaic) may appear to be a particular color, even though none of the smaller images include the particular color. Similarly, a night sky having a few bright stars may appear to be bright, in comparison to a dark background, even though the night sky may be predominantly dark.

In one implementation, identifying the attribute associated with region 121 in block 440 may include identifying a particular feature of content included in the document and using this feature to determine the attribute. For example, a document may be classified based on a dominant color (e.g., red, green, blue) or brightness level (e.g., dark, moderate, or bright illumination).

Although FIG. 4 provides a flow diagram of exemplary process 400 for identifying an attribute associated with document 120, in other implementations, additional, fewer, or different steps may be used than depicted in FIG. 4. For example, process 400 may omit compiling document 120 and may determine the attribute associated with document 120 based on values in a style sheet or other code for document 120. In another implementation, region 121 identified in block 430 may be associated with a layer (e.g., the background or foreground) of document 120 and the identified attribute may correspond to that layer through multiple regions of document 120. Furthermore, one or more blocks in process in process 400 may be repeated, for example, to identify attributes associated with a document to be provided to multiple client devices, to form multiple documents 120, and/or to identify attributes in multiple regions 121 of document 120.

FIG. 5 provides a flow diagram of exemplary process 500 for selecting particular version 135 from versions 130 based an attribute of document 120 in block 340. In one implementation, process 500 may be performed by version selector 110. In other implementations, some or all of process 500 may be performed by another device or a group of devices separate from version selector 110 and/or including version selector 110.

Process 500 may include identifying preference data 140 associated with document 120 and/or versions 130 of the added data (block 510). Preference data may relate to desired attributes for document 120 and/or versions 130. For example, preference data 140 may define a particular attribute or range of attributes for particular version 135 (e.g., preference data 140 may specific a particular RGB color value or range of RGB color values). Preference data 140 may indicate a relationship between region 121 of document 120 and/or versions 130. For example, preference data 140 may indicate whether particular version 135 and region 121 should match, contrast, or coordinate. Preference data 140 may be received, for example, from an entity or user associated with document 120 (e.g., a content provider), versions 130 (e.g., a provider of the additional content, such as an advertiser when the additional content corresponds to an advertisement), and/or client device 170.

For example, a user at client device 170 may provide preferences regarding how additional content should overlaid on document 120. As an example, version selector 110 and/or document host 150 may provide client device 150 with a graphic user-interface (GUI) that allowed the customer at client device 170 to select the preferences. For example, auuser may request that all overlaid content be in a certain color (e.g., black), brightness, or blend in with the background.

The attribute value associated with document 120 and/or region 121 of document 120 may be compared to corresponding respective attribute values associated with versions 130 of the added content (block 520). For example, a RGB color value associated with region 121 of document 120 may be compared to respective different RGB color values associated with versions 130.

Particular version 135 of the added content may be selected based on the comparison and based on preference data 140 (block 530). For example, particular version 135 of the added content and region 121 of document 120 may match (e.g., particular version 135 has a color that corresponds with a color associated with region 121), contrast (e.g., particular version 135 has a color that sufficiently differs from the color associated with region 121), or coordinate with (e.g., particular version 135 has a similar color but a different brightness than the identified region).

In another implementation, if the identified attribute associated with document 120 or region 121 is associated with a category, such as a family of colors (e.g., red, green, or blue) or brightness level (e.g., dim, moderate, or bright illumination), as described with respect to block 440, particular version 135 of the added content may be selected based on the categorization. For example, one of red, green, or blue versions 130 of the added content may be selected based on the family of colors associated with the document.

In another implementation, an attribute associated with document 120 may be modified based on selected version 135 of the additional content when forming modified document 125. For example, a style sheet expression associated with a background color of modified document 125 may be modified based on a color value associated with selected version 135 of the additional content.

Although FIG. 5 provides a flow diagram of exemplary process 500 for selecting particular version 135 from versions 130 to include in document 120 based an attribute of document 120, in other implementations, additional, fewer, or different steps may be used than depicted in FIG. 5. For example, preference data 140 may be obtained and may be used to identify a particular attribute value or state (e.g., an advertiser specifies a particular color for associated advertisements), and particular version 135 further based on preference data 140. In additional, preference data 140 may be based on an amount of money that the advertiser pays. For example, if an advertiser pays more for an advertisement, content associated with advertisement may appear in a bolder, more notable color, size, font, etc., in a more prominent area (e.g., adjacent to the main character in a movie), and/or in a longer duration on content 120.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 3-5, the order of the blocks may be modified in other implementations. Further, non-dependent blocks may be performed in parallel.

Figure 6:
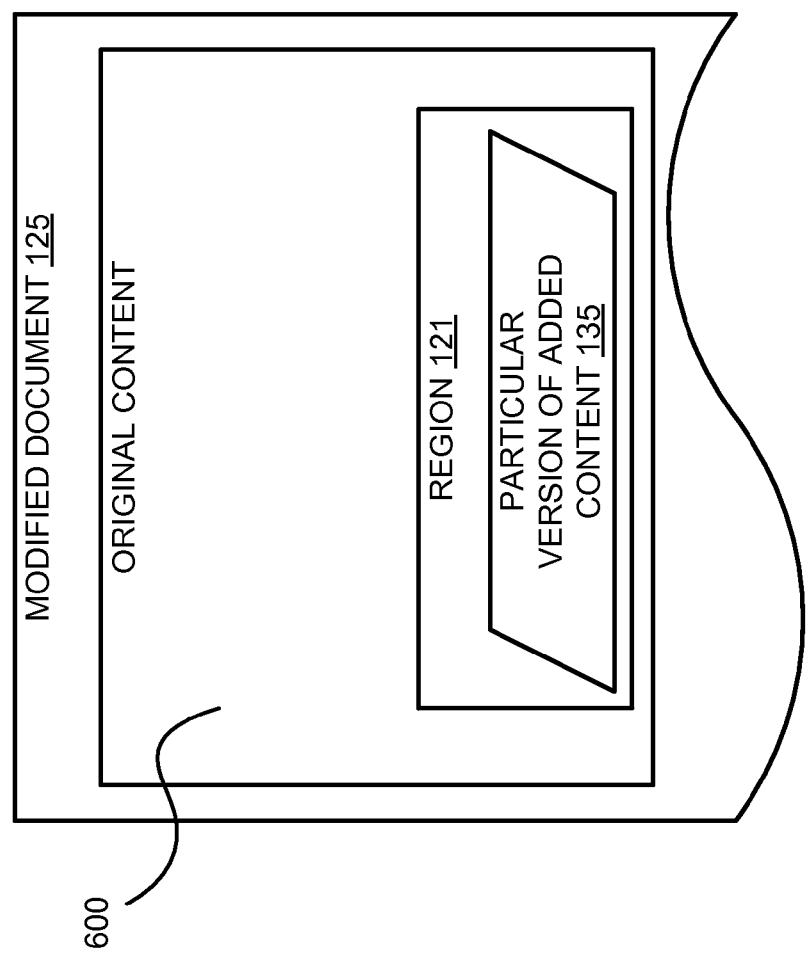
FIG. 6 depicts an example modified document that is formed according to the process depicted in FIGS. 3-5.

FIG. 6 depicts an example modified document 125 that is formed according to an in implementation provided herein. For example, document 125 may include additional content, and a region 121 of original content 120 may be selected. A particular version 135 of additional content to be overlaid over region 121 may be selected from multiple possible versions 130 of the additional content based on attributes if region 121, original content 600, and versions 130. For example, if original content 600 corresponds to a movie or a television show, versions 130 of the addition content may correspond to different colors closed caption for audio corresponding to original content 600. Particular version 135 may be selected to complement of portions of the movie or telephone show in region 121. Region 121 may vary, for example, to move particular version 135 (e.g., closed captioning) to a portion of original content 600 that complements the particular version 135.

Although FIG. 6 provides modified document 125, in other implementations, modified document 125 may include additional, fewer, or different contents steps than depicted in FIG. 6. For example, modified document 125 may include multiple regions 121 over which additional content is overlaid. In addition, region 121, although depicted in FIG. 6 as being a portion of original content 600, may be separate from original content 600. For example, original content 600 may be compressed and/or moved to create space for region 121. For example, original content (e.g., a movie or telephone show) may be provided in a first graphical box and particular version 135 of the additional content may be presented in a separate box.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   identifying, by a processor, a first color associated with a region of a document requested by a client device, wherein a plurality of versions of data to be added to the document are associated with, respectively, a plurality of second colors, wherein the plurality of versions of the data are associated with versions of the document rendered by the client device during a first time period, and wherein identifying the first color includes:
      identifying a color presented within the region when the document is rendered by the client device during each of a plurality of second time periods preceding the first time period;
      identifying a trend in the colors presented within the region during the plurality of second time periods;
      determining, based on the trend and the colors presented during the plurality of second time periods, a predicted color to be presented within the region during the first time period; and
      identifying the first color as the predicted color;
   comparing, by the processor, the first color and the plurality of second colors to form comparison results;
   selecting, by the processor and based on the comparison results, a particular version of the plurality of versions of the data;
   generating, by the processor, a modified document that includes the particular version of the data; and
   providing, by the processor, the modified document to the client device, wherein the client device, when rendering the modified document during the first time period, presents the particular version of the data within the region.

2. The method of claim 1, further comprising:
   executing a style sheet associated with the document to identify contents of the document.

3. The method of claim 2, further comprising:
   identifying one or more attributes associated with the client device; and
   executing the style sheet based on the one or more attributes associated with the client device.

4. The method of claim 1, further comprising:
   identifying preference data, wherein:
      the preference data indicates whether a particular one of the plurality of second colors, associated with the particular version of the data, matches, complements, or contrasts with the first color associated with the region of the document, and
      selecting the particular version is further based on the preference data.

5. The method of claim 1, further comprising:
   identifying preference data, wherein:
      the preference data identifies a subset of the plurality of second colors, and
      the particular version is selected from a subset of the plurality of versions associated with the subset of the plurality of second colors.

6. The method of claim 1, wherein:
   the region includes a plurality of graphical elements, and
   identifying the first color includes:
      determining respective third colors associated with the plurality of graphical elements, and
      identifying the first color further based on the respective third colors.

7. The method of claim 1, further comprising:
   identifying a brightness level associated with the region when the document is rendered by the client device during each of the plurality of second time periods; and
   determining, based on the brightness levels associated with the region during the plurality of second time periods, a predicted brightness level associated with the region during the first time period,
   wherein the plurality of versions of data to be added to the document are associated with, respectively, a plurality of brightness levels, and wherein the particular version of the data is further selected based on comparing the predicted brightness level to the plurality of brightness levels.

8. The method of claim 1, wherein identifying the trend in the colors presented within the region during the plurality of second time periods includes:
   performing a Markov chain analysis on the colors to identify the trend.

9. A device comprising:
   a memory configured to store instructions; and
   a processor configured to execute one or more of the instructions to:
      identify a first color associated with a region of a document requested by a client device, wherein a plurality of versions of data to be added to the document are associated with, respectively, a plurality of second colors, wherein the plurality of versions of the data are associated with versions of the document rendered by the client device during a first time period, and wherein the processor, when identifying the first color, is further configured to:
identify a color presented within the region when the document is rendered by the client device during each of a plurality of second time periods preceding the first time period,
identify a trend in the colors presented within the region during the plurality of second time periods,
determine, based on the trend and the colors presented during the plurality of second time periods, a predicted color to be presented within the region during the first time period, and
identify the first color based on the predicted color,
compare the first color and the plurality of second colors to form comparison results,
select, based on the comparison results, a particular version of the plurality of versions of the data, and
form a modified document that includes the particular version of the data, wherein the client device, when rendering the modified document during the first time period, presents the particular version of the data within the region.

10. The device of claim 9, wherein the processor is further configured to:
identify preference data associated with the document, wherein the preference data indicates whether a particular one of the plurality of second colors, associated with the particular version of the data, should match, complement, or contrast with the first color associated with the region of the document, and
wherein the processor, when selecting the particular version of the data, is further configured to select the particular version of the data based on the preference data.

11. The device of claim 9, wherein the processor is further configured to:
identify preference data associated with the document, wherein the preference data identifies a subset of the plurality of second colors, and
wherein the processor, when selecting the particular version of the data, is further configured to select the particular version from a subset of the plurality of versions associated with the subset of the plurality of second colors.

12. The device of claim 9, wherein the processor, when identifying the first color, is further configured to:
execute code associated with the document to identify content of the document, and
identify the first color further based on the content of the document.

13. The device of claim 12, wherein the processor, when executing the code, is further configured to:
identify one or more attributes associated with at least one of the client device or a network connecting the device and the client device; and
execute the code based on the one or more attributes associated with the at least one of the client device or the network.

14. The device of claim 9, wherein:
the region includes a plurality of graphical elements, and
the processor, when identifying the first color, is further configured to:
determine attributes associated with, respectively, the plurality of graphical elements, and
identify the first color further based on the attributes.

15. The device of claim 9, wherein the particular version is a first version of the data, and wherein the processor is further configured to:
determine, based on the first color and one or more colors presented within the region during the second time periods, a third color to be presented within the region during a third time period that is after the first time period and the second time periods; and
select, based on the third color, a second version of the plurality of versions of the data, wherein the modified document further includes the second version of the data, and wherein the client device, when rendering the modified document during the third time period, presents the second version of the data within the region.

16. A non-transitory computer-readable medium configured to store instruction, the instructions comprising:
one or more instructions that, when executed by a processor, cause the processor to:
identify a first color associated with a region of a document requested by a client device, wherein a plurality of versions of data to be added to the document are associated with, respectively, a plurality of second colors, wherein the plurality of versions of the data are associated with versions of the document rendered by the client device during a first time period, and wherein the one or more instructions that cause the processor to identify the first color further comprise one or more instructions that cause the processor:
identify a color presented within the region when the document is rendered by the client device during each of a plurality of second time periods preceding the first time period,
identify a trend in the colors presented within the region during the plurality of second time periods,
determine, based on the trend and the colors presented during the plurality of second time periods, a predicted color to be presented within the region during the first time period, and
identify the first color based on the predicted color,
compare the first color and the plurality of second colors to form comparison results,
select, based on the comparison results, a particular version of the plurality of versions of the data, and
form a modified document that includes the particular version of the data, wherein the client device, when rendering the modified document during the first time period, presents the particular version of the data within the region.

17. The non-transitory computer-readable medium of claim 16, wherein the one or more instructions further cause the processor to:
determine preference data,
wherein the preference data identifies a relationship between a particular second color, associated with the particular version of the data, and the first color associated with the region, and
wherein the particular version is selected based on the preference data.

18. The non-transitory computer-readable medium of claim 17, wherein the preference data further identifies a subset of the plurality of second colors, and
wherein the particular version of the data is selected from a subset of the plurality of versions of the data associated with the subset of the plurality of second colors.

19. The non-transitory computer-readable medium of claim 16, wherein the one or more instructions further cause the processor to:
   identify one or more attributes associated with at least one of a client device or a network connecting to the client device; and
   identify the colors presented within the region during the plurality of second time periods based on the one or more attributes.

20. The non-transitory computer-readable medium of claim 16, wherein the document, when rendered by the client device, includes a plurality of regions, and wherein the one or more instructions further cause the processor to:
   determine preference data, wherein the preference data identifies a desired attribute associated with presenting the data, and
   select the region from the plurality of regions included in the rendered document based on the preference data.

* * * * *